United States Patent
Chen et al.

(10) Patent No.: US 6,650,912 B2
(45) Date of Patent: Nov. 18, 2003

(54) SELECTING PAGING CHANNEL MODE

(75) Inventors: Jiangxin Chen, San Diego, CA (US);
Arthur Neufeld, San Diego, CA (US);
Serguei Glazko, San Diego, CA (US);
Messay Amerga, San Diego, CA (US)

(73) Assignee: Qualcomm, Incorporated, San Diego, CA (US)

(*) Notice: Subject to any disclaimer, the term of this patent is extended or adjusted under 35 U.S.C. 154(b) by 0 days.

(21) Appl. No.: 09/956,324

(22) Filed: Sep. 18, 2001

(65) Prior Publication Data

US 2003/0008691 A1 Jan. 9, 2003

Related U.S. Application Data

(60) Provisional application No. 60/233,161, filed on Sep. 18, 2000.

(51) Int. Cl.[7] .................. H04B 1/38; H04M 1/00; H04Q 7/20
(52) U.S. Cl. .................. 455/574; 455/458; 455/5.3; 455/226.2
(58) Field of Search .................. 455/574, 458, 455/464, 513, 572, 226.1, 226.2

(56) References Cited

U.S. PATENT DOCUMENTS

| | | | |
|---|---|---|---|
| 4,715,048 A | * 12/1987 | Masamura | 375/347 |
| 5,561,598 A | * 10/1996 | Nowak et al. | 364/148 |
| 5,627,760 A | * 5/1997 | Slutsker et al. | 307/59 |
| 5,862,453 A | * 1/1999 | Love et al. | 370/335 |
| 5,905,962 A | * 5/1999 | Richardson | 455/506 |
| 5,991,600 A | * 11/1999 | Anderson et al. | 340/7.34 |
| 6,085,104 A | * 7/2000 | Kowalski et al. | 370/335 |
| 6,111,865 A | * 8/2000 | Butler et al. | 340/7.42 |
| 6,160,886 A | * 12/2000 | Romesburg et al. | 379/406.05 |
| 6,195,555 B1 | * 2/2001 | Dent | 342/350 |
| 6,286,994 B1 | * 9/2001 | Boesel et al. | 374/146 |
| 6,393,295 B1 | * 5/2002 | Butler et al. | 340/7.32 |
| 6,539,211 B1 | * 3/2003 | Abrishamkar et al. | 455/161.2 |
| 2002/0123357 A1 | * 9/2002 | Abrishamkar et al. | 455/458 |
| 2002/0123358 A1 | * 9/2002 | Butler et al. | 455/458 |

FOREIGN PATENT DOCUMENTS

| | | |
|---|---|---|
| WO | 0054442 | 9/2000 |
| WO | 0154445 | 7/2001 |

* cited by examiner

*Primary Examiner*—Nay Maung
*Assistant Examiner*—Edan Orgad
(74) *Attorney, Agent, or Firm*—Phillip R. Wadsworth; Charles D. Brown; Howard H. Seo

(57) ABSTRACT

A quick paging channel (QPCH) is used to receive paging indicators that indicate that a wireless communication device (WCD) has a message on a paging channel relating to, for example, an incoming call to the WCD. When the condition of the quick paging channel is too low to receive paging indicators reliably, the quick paging channel is disabled to avoid false alarms, and the slotted paging channel is used to receive paging messages without monitoring the QPCH. When the QPCH signal is strong, the probability of false alarms is lower, and the quick paging channel is enabled. By using the quick paging channel to receive paging indicators only when the QPCH signal is strong, the wireless communication device can remain in a sleep state for greater periods of time as compared with the use of a slotted paging channel. As a result, standby time may be significantly improved.

40 Claims, 6 Drawing Sheets

SELECTING PAGING CHANNEL MODE

CROSS-REFERENCE TO RELATED APPLICATIONS

This application claims the benefit of provisional U.S. application Ser. No. 60/233,161, entitled "A METHOD OF CHANNEL ESTIMATION WITH THE APPLICATION OF THE QUICK PAGING CHANNEL DEMODULATION IN CDMA2000" filed Sep. 18, 2000, which is incorporated herein by reference in its entirety for all purposes.

FIELD OF THE INVENTION

The invention relates to wireless communications and, more particularly, to wireless communications using spread spectrum techniques.

BACKGROUND

Wireless communication systems are widely deployed to provide various types of communication, such as voice and data communications. These systems may be based on a variety of modulation techniques, such as code division multiple access (CDMA) or time division multiple access (TDMA). A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for CDMA2000 Spread Spectrum Systems," the "C.S0005-A Upper Layer (Layer 3) Signaling Standard for CDMA2000 Spread Spectrum Systems," and the "C.S0024 CDMA2000 High Rate Packet Data Air Interface Specification" (the CDMA2000 standard), and (4) some other standards.

CDMA systems use a slotted paging channel to notify wireless communication devices (WCDs) of incoming calls and to send other control information. To conserve power, idle WCDs, e.g., WCDs that are not currently in a call, "wake up" during periodic allocated time slots to monitor the paging channel for messages that may indicate an incoming call or convey other information. During the rest of the time, idle WCDs shut down most of their circuits and enter a "sleep" state. The intervals at which a WCD monitors the paging channel may be set via service programming. For example, the WCD may be programmed to monitor the paging channel once every 1.28 seconds. Longer intervals conserve more power, but increase the time involved in paging a WCD for an incoming call. The slotted paging mode allows the WCD to remain in a power-efficient sleep state most of the time, increasing standby time.

In order to determine whether the slotted paging channel is carrying a message for a particular WCD, the WCD must demodulate the entire message. Messages transmitted using the paging channel are at least 20 milliseconds (ms) in duration, and more often approach 40–50 ms. As a result, when the WCD wakes up to receive a message using the paging channel, the WCD must wake up for at least 20 ms, for example, every 1.28 seconds. The WCD incurs additional overhead both before and after receiving the message. Before receiving the message, for example, the WCD must warm up the RF circuit, and must resynchronize its timing and frequency references with a base station. In addition, after receiving and demodulating the message, the WCD must process the message to determine whether the message is destined for the WCD.

For improved power conservation, the CDMA2000 and W-CDMA standards specify an alternate paging channel that transmits paging indicators. These indicators are typically less than 1 ms in length and indicate that a WCD has a paging message in the paging channel. The time involved in demodulating paging indicators is decreased compared to the time involved in demodulating a paging message, and the WCD can remain in the sleep state for a greater portion of each cycle when the paging indicator indicates that the WCD does not have a paging message in the paging channel. Standby time is thereby improved without significant degradation of paging channel performance. In the CDMA2000 standard, this alternate paging channel is known as the quick paging channel (QPCH). In the W-CDMA standard, the alternate paging channel is known as the paging indicator channel (PICH).

In order to guarantee satisfactory performance in the quick paging channel, conventional WCDs set a QPCH demodulation threshold such that the probability of detecting a transmitted paging message is high. With the threshold thus set, the probability of missing a paging message due to errors in demodulating the quick paging channel is low. This bias in the threshold setting, however, may cause a significant increase in falsely detecting a transmitted paging message when no such message was transmitted.

False alarms can cause the WCD to spend significant amounts of time demodulating paging messages that do not actually exist. With the time involved in demodulating the quick paging channel, e.g., the time involved in warming up the RF circuit, resynchronizing the timing and frequency references of the WCD with the base station, QPCH demodulation, and post-processing, high false alarm rates may make the overall average wakeup time with the alternate paging channel enabled worse than that realized with the slotted paging channel. Accordingly, the power conservation benefits that may otherwise be realized by using a quick paging channel may be reduced or even eliminated by a high false alarm rate.

SUMMARY

In general, the invention improves the standby time of a wireless communication device (WCD), such as a mobile phone, by using an alternate paging channel to receive paging indicators when the alternate paging channel is of sufficient condition. In particular, a channel estimator predicts the condition of the alternate paging channel, i.e., the strength of the QPCH signal, based on historical measurements of the pilot signal strength, which is an indicator of the condition of the alternate paging channel. When the QPCH signal is weak, the alternate paging channel is disabled to avoid false alarms, and the slotted paging channel is used to receive paging messages without monitoring the alternate paging channel for a paging indicator. On the other hand, when the QPCH signal is strong, the probability of false alarms is lower, and the alternate paging channel is enabled.

The invention may provide a number of benefits. By using the alternate paging channel to receive paging indicators only when the signal strength is sufficiently high, a WCD may take advantage of the short duration of paging indicators carried on the alternate paging channel while reducing susceptibility of false alarms. For example, the WCD may receive a paging indicator that indicates that no paging message is present and return to a sleep state rather than remain awake to demodulate a paging message when none is present. Thus, the wireless communication device may remain in a sleep state for greater periods of time during slot cycles in which no paging message is present. As a result, standby time may be significantly improved.

According to various embodiments of the invention, a paging channel demodulator can operate in either of two modes. When an estimated signal strength of a quick paging channel is at least a threshold value, the paging channel demodulator operates in a first mode in which it demodulates a paging indicator received via a quick paging channel. When the estimated QPCH signal strength is less than the threshold value, the paging channel demodulator operates in a second mode in which it demodulates a paging message received via a slotted paging channel.

In one embodiment, the invention is directed to a demodulation method implemented in a spread spectrum system. According to the method, a signal strength in a paging channel is predicted, and the paging channel is selectively enabled based on the predicted signal strength of the paging channel. In particular, the paging channel may comprise an alternate paging channel, such as the Quick Paging Channel (QPCH) of CDMA 2000 or the Paging Indicator Channel (PICH) of W-CDMA, and may be enabled when the predicted signal strength is at least a threshold. This alternate paging channel carries paging indicators that are shorter than the paging messages used to indicate an incoming call. The alternate paging channel may be disabled when the predicted signal strength is less than the threshold, and a slotted paging channel may be monitored for a paging message. Predicting the signal strength may comprise estimating the signal strength as a function of historical pilot Ec/Io information representative of a pilot signal strength and a total received power spectral density in a carrier band.

Additional details of various embodiments are set forth in the accompanying drawings and the description below. Other embodiments, for example, include processor-readable media and apparatuses embodying these methods. Other features and advantages will become apparent from the description and drawings, and from the claims.

DETAILED DESCRIPTION

Figure 1:
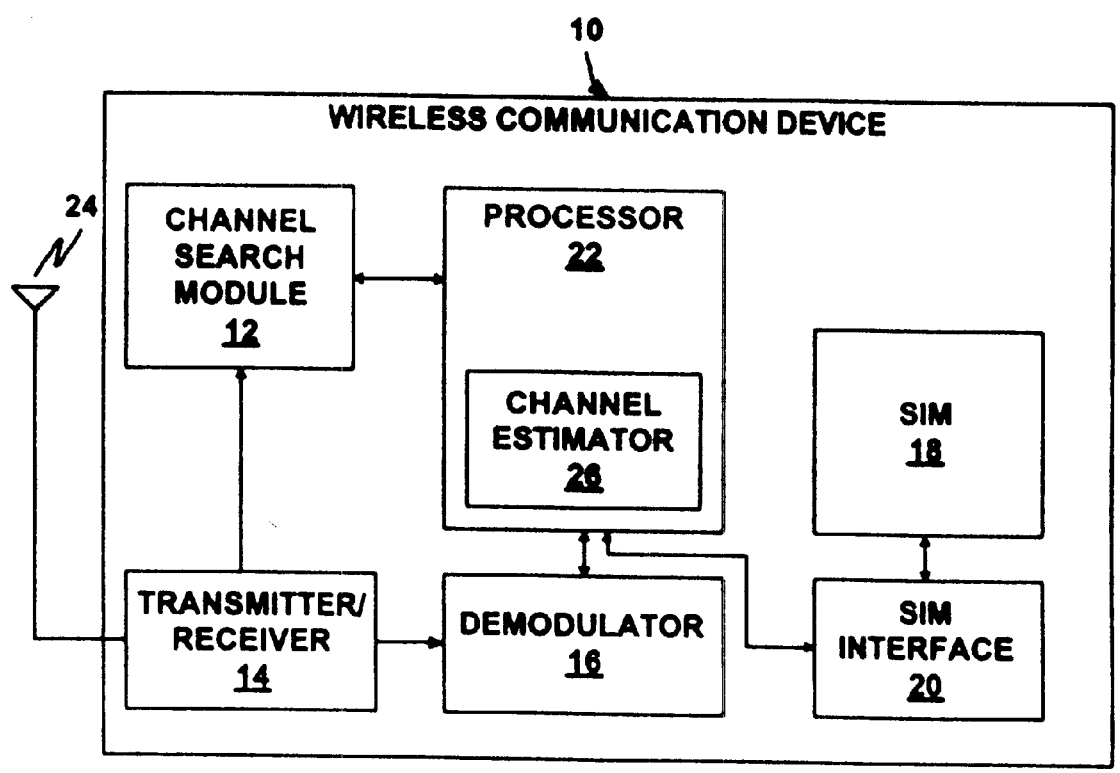
FIG. 1 is a block diagram illustrating a wireless communication device (WCD) that selectively enables an alternate paging channel.

FIG. 1 is a block diagram illustrating an example wireless communication device (WCD) 10 that selectively enables an alternate paging channel. WCD 10 includes a channel search module 12, radio frequency transmitter/receiver 14, a demodulator 16, a subscriber identity module (SIM) 18, a SIM interface 20, a microprocessor 22, and a radio frequency antenna 24. Non-limiting examples of WCD 10 include a cellular radiotelephone, satellite radiotelephone, a PCMCIA card incorporated within a computer, a PDA equipped with wireless communication capabilities, and the like.

WCD 10 may be designed to support one or more CDMA standards and/or designs (e.g., the W-CDMA standard, the IS-95 standard, and the CDMA2000 standard). Demodulator 16 includes demodulator/decoder circuitry coupled to transmitter/receiver 14 to receive spread spectrum communication signals. SIM interface 20 includes circuitry that drives communication between demodulator 16 and SIM 18.

Paging messages may be used to notify WCD 10 of incoming calls or to transmit control information. The paging messages may be transmitted to WCD 10 via a paging channel operating in either a slotted mode or a non-slotted mode. In the non-slotted mode, paging messages may be transmitted to WCD 10 at any time. Accordingly, WCD 10 must remain in an awake state to receive paging messages. In the slotted mode, by contrast, a particular WCD will only receive paging messages during an allocated time slot within a slot cycle of, e.g., 1.28 seconds. An alternate paging channel, such as a quick paging channel (QPCH) or W-CDMA paging indicator channel (PICH), may be used to transmit a paging indicator that notifies WCD 10 when WCD 10 has a paging message in the paging channel in slotted mode. While some embodiments of the invention are described in relation to the QPCH, it is to be understood that the principles of the invention may also be applied in relation to the PICH or other alternate paging channels. Accordingly, unless otherwise noted in a particular context, the term "alternate paging channel" as used herein includes both the CDMA2000 quick paging channel (QPCH) and the W-CDMA paging indicator channel (PICH). In addition, any references herein to the CDMA2000 quick paging channel or QPCH are understood to be equally applicable to the W-CDMA paging indicator channel or PICH unless otherwise noted.

Each 80 ms QPCH slot contains two bits, denoted as paging indicators, for each WCD that indicate whether the WCD has a paging message in the next common control channel or paging channel slot. If the WCD has a paging message, both paging indicators will be set to a value of 1. If not, both paging indicators will have a value of 0. The two paging indicators are uncoded on-off keyed (OOK) symbols and are separated by at least 20 ms to gain time diversity. They are transmitted on either the I channel or the Q channel in a CDMA-based spread spectrum system, or both, depending on the symbol rate, whether the base station is operating in 1x or 3x mode, and whether the base station is operating in orthogonal transmit diversity (OTD) or non-OTD mode. For example, in the 1x non-OTD mode, the paging indicators are transmitted in both the I and Q channels. The base station may set the paging indicator rate to either 9600 symbols/sec (full rate) or 4800 symbols/sec (half rate). The difference between the QPCH power and the pilot channel power is selected from the values 2, 1, 0, −1, −2, −3, −4, and −5 dB and is broadcast to the WCDs.

WCD 10 periodically "wakes up" from a sleep state and monitors a selected one of the paging channels for a paging message. Specifically, at prescribed intervals, radio frequency transmitter/receiver 14 warms up, and the timing and frequency references of a WCD in radio frequency transmitter/receiver 14 are synchronized with a nearby base station. If a paging message is present on the selected paging channel, demodulator 16 demodulates the message for processing by microprocessor 22.

As described above, paging indicators may be used to indicate whether WCD 10 has a paging message on the paging channel. When WCD 10 does not have a paging message, WCD 10 may return to a sleep state rather than remaining in an awake state, thus conserving power by reducing the amount of time that WCD 10 must remain awake in cycles in which no paging message is present. Standby time may be increased as a result. If the condition of the quick paging channel is poor, however, the false alarm rate may be high and, in some cases, may exceed 50%. High false alarm rates cause WCD 10 to erroneously detect and attempt to demodulate many nonexistent paging messages, thereby wasting power and reducing standby time. Accordingly, consistent with the principles of the invention, WCD 10 only uses the quick paging channel to receive paging indicators when the channel condition is sufficient to produce an acceptably low false alarm rate. Otherwise, WCD 10 disables the quick paging channel and receives paging messages without monitoring the quick paging channel for a paging indicator.

In order to select the most appropriate operation mode, WCD 10 incorporates a channel estimator module 26 for predicting the condition or strength of the alternate paging channel. As shown in FIG. 1, channel estimator module 26 may be implemented as one or more software modules executed by microprocessor 22. Alternatively, channel estimator module 26 may be implemented in whole or part as dedicated hardware within WCD 10.

In one embodiment, channel estimator module 26 estimates the signal strength based on historical channel strength measurements of the alternative paging signal during previous time slots. One known standard measurement of channel strength involves monitoring the signal strength of the pilot channel as a function of a total received power spectral density in the CDMA carrier band. This measurement is known in the art as pilot Ec/Io and provides a relative measure of interference within the system.

When the predicted pilot Ec/Io is low, it is likely that the alternative paging signal will be weak in the next alternate paging channel time slot, and WCD 10 disables the alternate paging channel and uses the slotted paging channel to receive and demodulate paging messages. On the other hand, when the predicted pilot Ec/Io is high, the alternative paging signal is likely to be strong in the next time slot, and WCD 10 enables the alternate paging channel.

Figure 2:
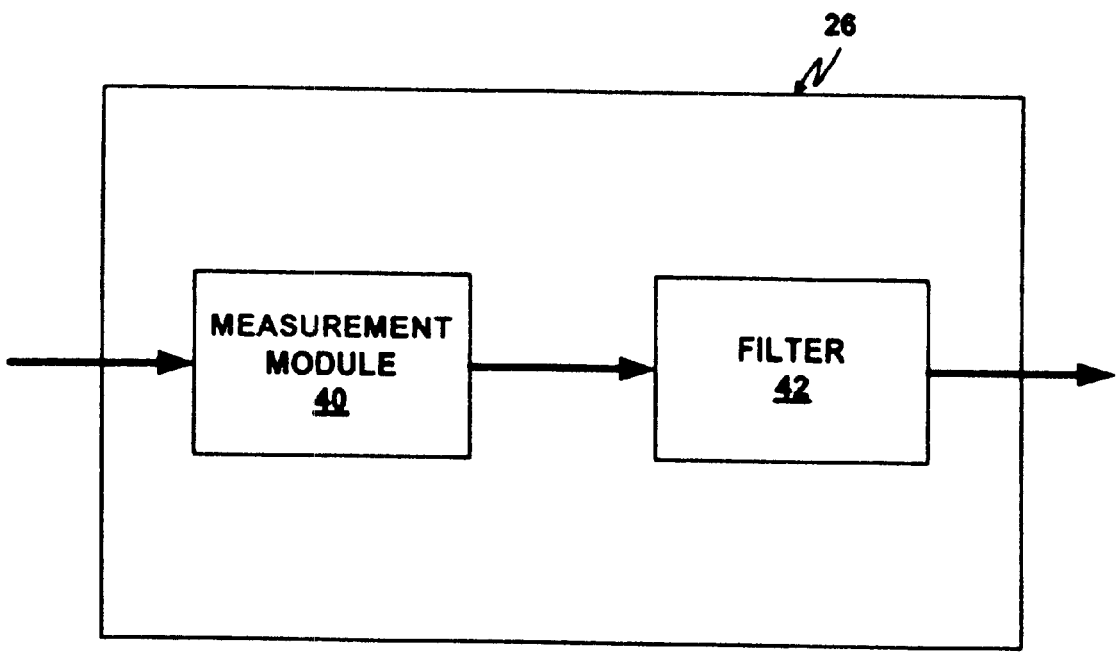
FIG. 2 is a block diagram illustrating an example channel estimator module of the WCD.

FIG. 2 is a block diagram illustrating one example implementation of channel estimator module 26. A measurement module 40 receives pilot signal strength measurements, e.g., pilot Ec/Io values, from demodulator 16 and channel search module 12 and, based on these measurements, calculates a channel condition indicator. While operating in the slotted paging or the alternative mode, WCD 10 is in sleep mode for most of the time and cannot measure the channel. Therefore, measurement module 40 may receive only sparse channel measurements from demodulator 16 and search module 12. These measurements include, for example: (1) channel searcher energy from channel search module 12 obtained when WCD 10 wakes up for the demodulation of the alternate paging channel, (2) a pilot strength estimate recorded at the end of demodulating each QPCH paging indicator, and (3) the searcher energy before the demodulation of the paging channel and the received signal strength indicator (RSSI) obtained at the end of the paging message demodulation. RSSI values are typically less susceptible to large variances than searcher energy measurements and are thus more reliable. In addition, RSSI values provide greater time diversity than searcher energy measurements. All available measurements during a given slot cycle may be combined as a single composite channel condition indicator, as described below.

These three input measurements are not necessarily always received from demodulator 16 and channel search module 12. Generally, once WCD 10 wakes up for the QPCH, WCD 10 completely demodulates the current paging indicator. Accordingly, measurements (1) and (2) usually occur together and are available whenever the QPCH is enabled. Depending on the demodulation output, one or two pairs of measurements (1) and (2) may occur in each slot cycle. By contrast, measurement (3) may only be available when the QPCH is disabled or when the QPCH demodulation result indicates that WCD 10 should demodulate the subsequent paging message. Compared to the length of a slot cycle, e.g., 1.28 seconds, these pilot Ec/Io measurements are close to each other and thus can be considered as a single input to channel estimator module 26, which updates once per slot cycle.

Measurement module 40 provides the alternate paging channel strength measurements to a filter 42 that estimates the channel strength for the next slot cycle based on historical alternative channel strength measurements. For purposes of this discussion, the input to filter 42, i.e., the alternate paging channel strength (pilot Ec/Io) measurement, is denoted as $x[n]$ for the nth slot cycle. The estimated channel strength for the nth cycle is denoted as $\hat{y}[n]$. Filter 42 may obtain the estimated channel strength $\hat{y}[n]$ as a function of the pilot Ec/Io measurements for one or more prior slot cycles:

$$\hat{y}[n]=f(x[n-1], x[n-2], \ldots, x[1]).$$

Filter 42 may implement either a linear filter or a nonlinear filter, e.g., based on Markov chains. Because the implementation of a linear filter is less complicated and provides comparable performance to a nonlinear filter, filter 42 preferably implements a linear filter.

Filter 42 may implement various types of linear filters, such as a finite impulse response (FIR) or an infinite impulse response (IIR) filter. The advantage of an IIR filter is ease of implementation. However, the output of an IIR filter incorporates the information from all of the previous inputs. Considering the high rate of change of the mobile channel and the low update rate of channel estimator module 26, an IIR filter may not be able to track the channel change effectively. An FIR filter, which incorporates information from a limited number of previous inputs, may be able to track changes in the mobile channel more effectively than an IIR filter. Due to the dynamic change of the channel, the length of the FIR filter should be as short as possible, while avoiding severe degradation in performance. In a dynamically changing environment, performance improves as the filter length increases. However, if the filter has too many taps, the long residual memories of historical information may make it harder to keep up with changes in the channel, thereby degrading performance. A filter length of eight taps, for example, provides a good balance. It should be noted that for an IIR filter with a large bandwidth, the output is largely determined by a few of the most recent input samples. Accordingly, some FIR filters may be approximated by an IIR filter, which is more easily implemented.

Filter 42 may have, for example, equal tap weights or exponentially decaying tap weights. Alternatively, the tap weights of filter 42 may be selected according to some other scheme. If filter 42 has equal tap weights, the estimated channel strength $\hat{y}[n]$ can be expressed as:

$$\hat{y}[n] = \frac{1}{L}\sum_{i=1}^{L} x[n-i],$$

where L is the number of taps. That is, the estimated channel strength is the average of the pilot Ec/Io measurements in the most recent L slot cycles. An FIR filter having equal tap weights offers a number of benefits. For example, an equal-tap FIR filter minimizes the variance of the estimation, assuming that the channel is stable and that the measurements x[n−1], x[n−2], ..., x[1] are independent. An example of an equal-tap FIR filter is an FIR Wiener filter that minimizes the mean square prediction error in a stable channel. The use of equal tap weights may also promote low computational complexity.

If, on the other hand, filter 42 has exponentially decaying tap weights, the estimated channel strength $\hat{y}[n]$ can be expressed as:

$$\hat{y}[n] = c\sum_{i=1}^{L} \alpha^i x[n-i].$$

where c is chosen such that $$c\sum_{i=1}^{L} \alpha^i = 1$$

to ensure an unbiased estimate when the channel is stable. In a stable channel, an equal tap filter yields better performance than a filter having exponentially decaying tap weights. The exponential factor $\alpha$ is selected such that the performance does not degrade too much in a stable environment and is better than an equal tap filter in a dynamically changing environment. Setting $\alpha=0.8$ provides satisfactory performance. However, because a filter having exponentially decaying tap weights gives more weight to more recent measurements and less weight to older measurements, it will perform better when the channel is dynamically changing. Accordingly, a tradeoff exists between optimizing performance in a stable channel and the ability to track the dynamics of the channel.

As described above in connection with FIG. 1, there are three possible sources that can provide pilot Ec/Io measurements. The searcher energy and the pilot strength estimate for the ith paging indicator, where i has a value of 1 or 2, in the nth slot cycle are respectively denoted as $srch_i[n]$ and $pilot_i[n]$. The RSSI after demodulating the paging message in the nth slot cycle as RSSI[n]. According to an embodiment of the invention, these values may be combined as a single input to channel estimator module 26 to form a channel estimate of the current slot cycle x[n]. Assume that $srch_i[n]$, $pilot_i[n]$, and RSSI[n] have been scaled properly to remove the influence of hardware operations and filter coefficients such that the mean values of $srch_i[n]$, $pilot_i[n]$, and RSSI[n] are the pilot Ec/Io values in a linear scale. Depending on the operation of demodulator 16 of FIG. 1 and of channel estimator module 26, a subset of $srch_i[n]$, $pilot_i[n]$, and RSSI[n] is obtained for each slot cycle, and these values are measured at different times. The standard deviations of $srch_i[n]$ and $pilot_i[n]$ are much larger than the standard deviation of RSSI[n]. In addition, RSSI[n] is a long term average of the channel compared to $srch_i[n]$ and $pilot_i[n]$. To simplify analysis, all three quantities may be assumed to have a Gaussian distribution.

Either of two techniques may be used to combine $srch_i[n]$, $pilot_i[n]$, and RSSI[n] into a single input x[n]. One such technique involves a maximal ratio combining of the measurements, that is, $$x[n] = K_1 \left( \sum_{i=1}^{2} \left( \frac{1}{\text{var}\{srch_i[n]\}} srch_i[n] + \frac{1}{\text{var}\{pilot_i[n]\}} pilot_i[n] \right) + \frac{1}{\text{var}\{RSSI[n]\}} RSSI[n] \right).$$

assuming all of the pilot Ec/Io measurements are available for a given slot cycle. $K_1$ is chosen such that the mean of x[n] is still the average pilot Ec/Io. If not all the pilot Ec/Io measurements are available, $K_1$ needs to be adapted to maintain an unbiased input x[n]. If WCD 10 is moving at a high speed, however, better performance may be realized by using an equal gain combining technique:

$$x[n] = K_2 \left( \sum_{i=1}^{2} (srch_i[n] + pilot_i[n]) + RSSI[n] \right),$$

when all of the pilot Ec/Io measurements are available for a given slot cycle. $K_2$ is chosen such that the input x[n] is unbiased. The selection of a combining technique to form the input x[n] may depend on the channel condition. In most channel conditions, however, equal combining is more robust. Further, equal gain combining is easier to implement than maximal ratio combining.

Figure 3:
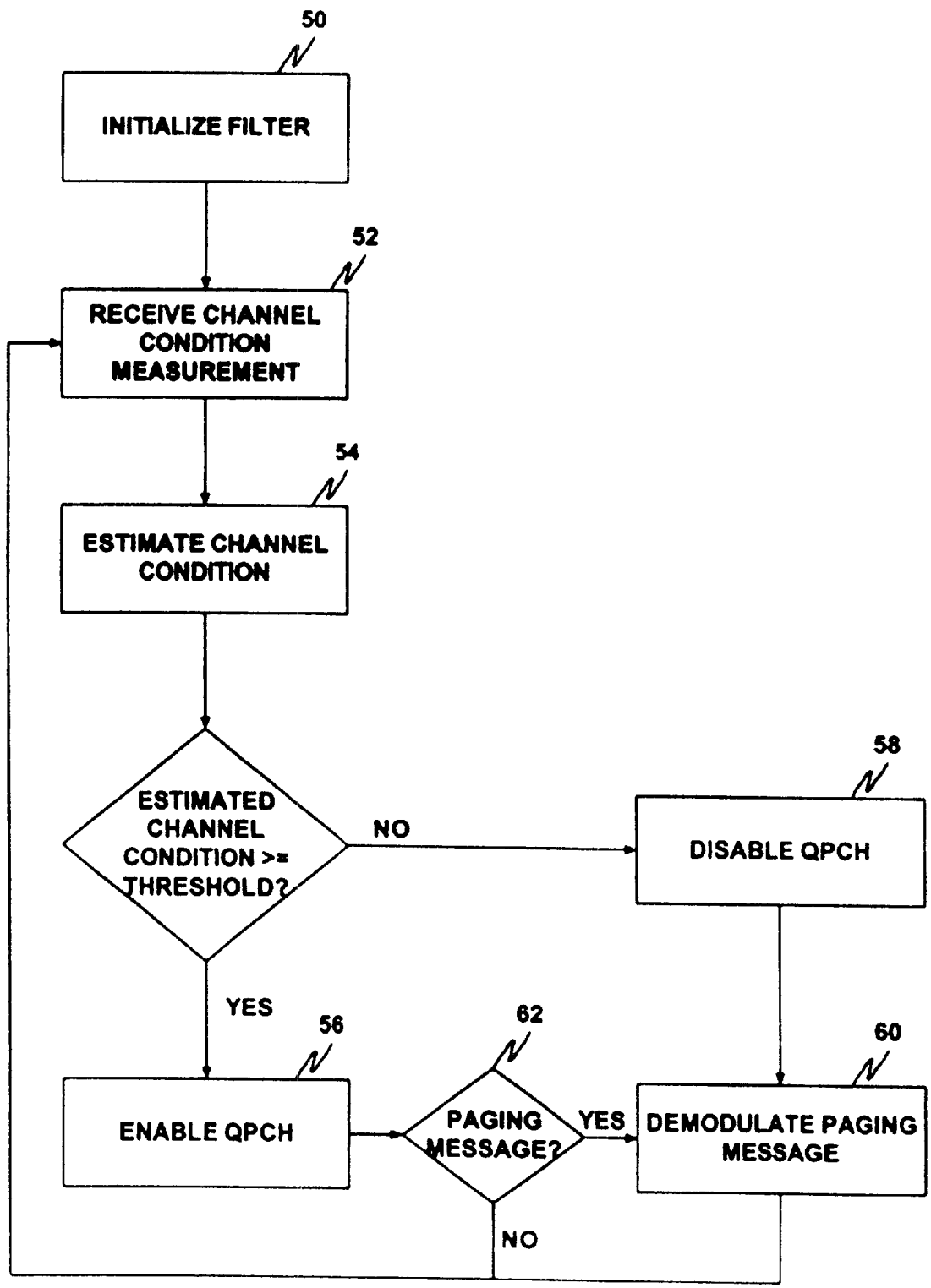
FIG. 3 is a flow diagram depicting a mode of operation of the channel estimator module.

FIG. 3 is a flow diagram illustrating a mode of operation of channel estimator module 26. First, filter 42 is initialized (50), for example, when the algorithm is started. Filter 42 may be initialized by setting all of the stored inputs x[n] to the first measurement after the beginning of the algorithm, i.e., $$x[n-i]=x[n], i=1, \ldots, L.$$

If filter 42 implements an IIR filter of the form $$\hat{y}[n]=\alpha\hat{y}[n-1]+(1-\alpha)x[n-1],$$

then filter 42 may be initialized by setting $\hat{y}[n]$ to the first measurement after the beginning of the algorithm:

$$\hat{y}[n]=x[n].$$

After filter 42 is initialized, measurement module 40 receives an input x[n] indicating the channel condition during the current slot cycle n (52). As described above, the input x[n] may be any of $srch_i[n]$, $pilot_i[n]$, and RSSI[n], or a combination of these measurements.

Based on the input x[n], filter 42 estimates the channel condition $\hat{y}[n]$ during the next slot cycle (54). If the estimated channel condition $\hat{y}[n]$ is greater or equal to a threshold value, processor 22 configures demodulator 16 to enable the alternate paging channel (56). The threshold value may be a service adjustable threshold value. On the other hand, if the estimated channel condition $\hat{y}[n]$ is less than the threshold, processor 22 configures demodulator 16 to disable the alternate paging channel (58), and WCD 10 receives paging messages without monitoring the alternate paging channel for paging indicators.

If the alternate paging channel is disabled, WCD 10 monitors the paging channel during an allocated time slot to receive and demodulate a subsequent paging message (60).

If the alternate paging channel is enabled, WCD 10 monitors the alternate paging channel to determine whether a paging message is present on the paging channel (62). If a paging message is present, WCD 10 receives and demodulates the paging message using the paging channel. If, on the other hand, no paging message is present, WCD 10 returns to the sleep state without waiting to demodulate the paging channel. After processing the paging message, WCD 10 returns to the sleep state until the next slot cycle. At the next slot cycle, WCD 10 wakes up and takes another measurement (52) to determine which paging channel to use.

Figure 4:
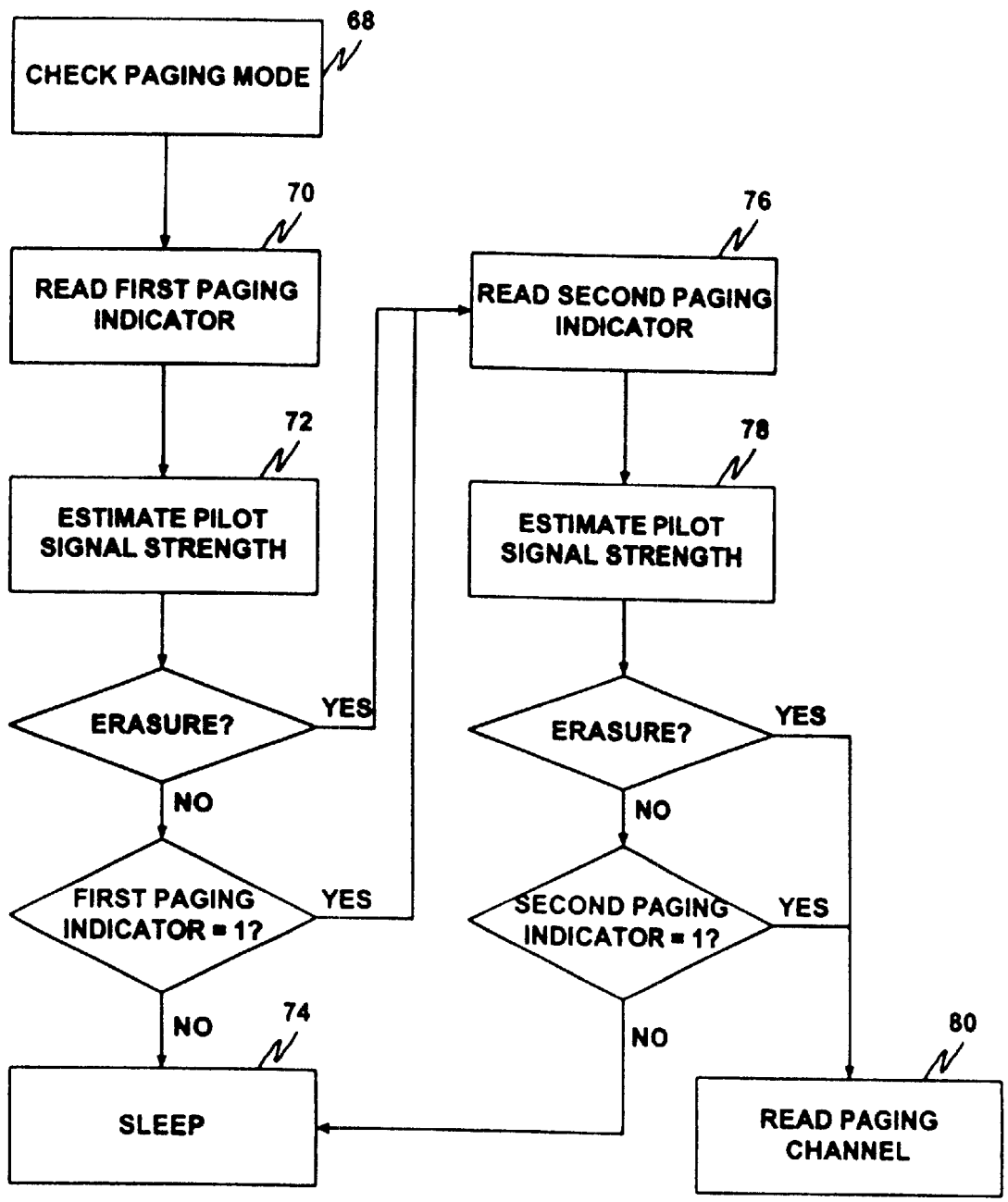
FIG. 4 is a flow diagram depicting a mode of operation of the WCD with an alternate paging channel enabled.

FIG. 4 is a flow diagram illustrating an example mode of operation of WCD 10 for demodulating a paging message when the quick paging channel (QPCH) is enabled. Initially, WCD 10 determines whether the alternate paging channel is enabled (68). If the alternate paging channel is enabled, WCD 10 reads the first of two paging indicators (70) and obtains a pilot strength estimate from the first paging indicator (72). In the 1x non-OTD mode, the paging indicator is transmitted in both the I and Q channels. If the pilot strength estimate is less than an erasure threshold, the first paging indicator is considered an "erasure," that is, neither definitely 1 (indicating a paging message) nor definitely 0 (indicating no paging message). If the pilot strength estimate is greater than the erasure threshold, WCD 10 can more definitely classify the paging indicator as having a value of either 0 or 1. WCD 10 determines the value of the first paging indicator. If the first paging indicator has a value of 0, WCD 10 determines that there is no paging message and goes to sleep (74).

If, on the other hand, the first paging indicator has a value of 1 or is considered an erasure, WCD 10 reads the second paging indicator (76) and obtains a pilot strength estimate from the second paging indicator to determine whether the second paging indicator is an erasure (78). If the pilot strength estimate of the second paging indicator is less than the erasure threshold, the second paging indicator is considered an erasure. If the pilot strength estimate is greater than the erasure threshold, WCD 10 determines the value of the second paging indicator. If the second paging indicator has a value of 0, WCD 10 determines that there is no paging message and goes to sleep (74). However, if the second paging indicator has a value of 1 or is considered an erasure, WCD 10 reads the paging channel (80) to obtain the paging message.

The first and second paging indicators generally have the same value, either both 0 or both 1. If both demodulated paging indicators have a value of 0, WCD 10 goes to sleep without reading the paging channel. If both demodulated paging indicators have a value of 1, WCD 10 reads the paging channel. If the demodulated paging indicators do not have the same value, WCD 10 will go to sleep if either demodulated paging indicator has a value of 0. Erasures are treated as having a value of 1 for purposes of determining whether to read the paging channel. Accordingly, WCD 10 errs in favor of reading the paging channel. While this may increase the likelihood of a false alarm, i.e., of reading the paging channel when no paging message is present, it also reduces the likelihood of missing a paging message.

Instructions for causing a processor provided in WCD 10, such as processor 22, to implement the operational modes described herein may be stored on processor readable media. By way of example, and not limitation, processor readable media may comprise storage media and/or communication media. Storage media includes volatile and nonvolatile, removable and fixed media implemented in any method or technology for storage of information such as processor-readable instructions, data structures, program modules, or other data. Storage media may include, but is not limited to, random access memory (RAM), read-only memory (ROM), EEPROM, flash memory, fixed or removable disc media, including optical or magnetic media, or any other medium that can be used to store the desired information and that can be accessed by a processor within WCD 10.

Figure 5:
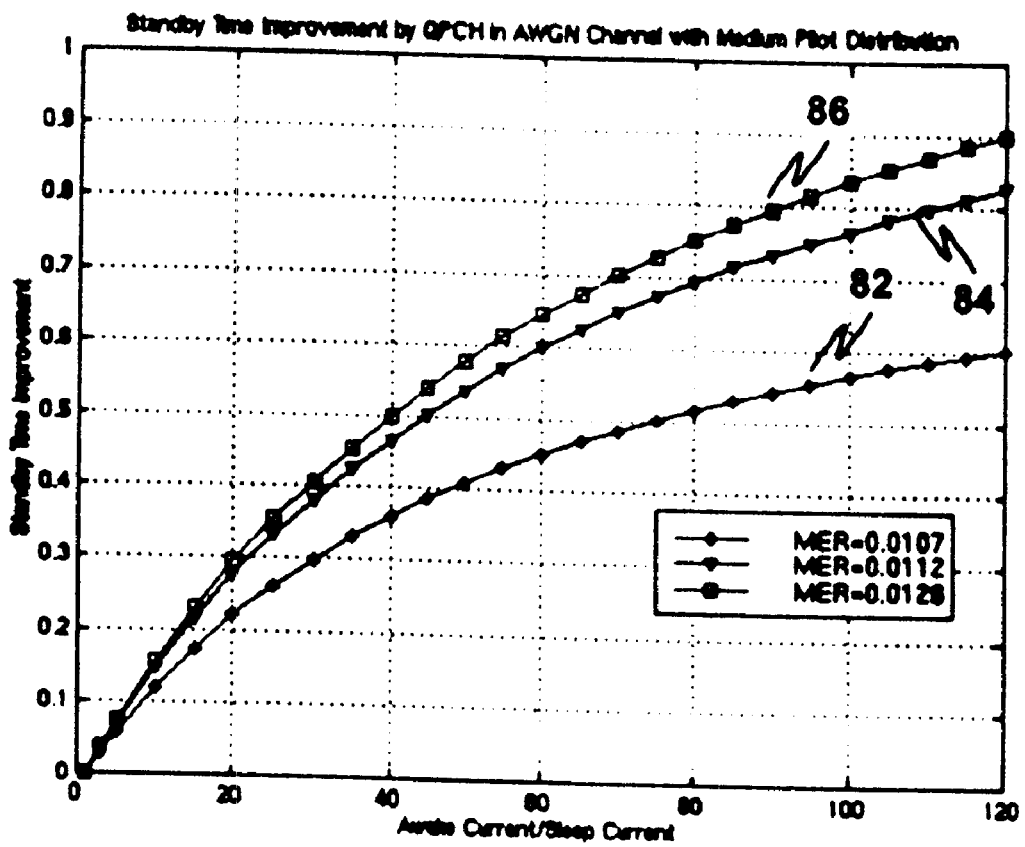
FIGS. 5 and 6 are graphs illustrating improvement in standby time in a WCD implementing the present invention.

As described above, using the quick paging channel to receive paging indicators improves the standby time of WCD 10 by allowing WCD 10 to remain in the sleep state for longer periods of time during slot cycles in which no paging message is present, thus conserving battery power. FIG. 5 illustrates the standby time improvement for an additive white Gaussian noise (AWGN) channel with a medium pilot distribution as a function of the ratio between the current drawn when WCD 10 is awake and the current drawn when WCD 10 is in the sleep state. For purposes of FIG. 5, standby time improvement is defined as the difference between the standby time using the QPCH and the standby time using the slotted paging channel, divided by the standby time using the slotted paging channel. Thus, for example, a standby time improvement of 1 indicates a 100% improvement in standby time. Graphs 82, 84 and 86 of FIG. 5 show the improvement in standby time when the paging message error rate (MER) is allowed to increase by 10%, 50%, and 100%, respectively. For example, graph 82 shows that when the MER is allowed to increase by 10% and the ratio of the awake current to the sleep current is 120, using the QPCH may result in a standby time improvement of approximately 60%.

As shown in FIG. 5, standby time may be significantly improved by using the alternate paging channel to receive and demodulate paging indicators. When WCD 10 uses the alternate paging channel, less time is needed to demodulate the shorter paging messages carried on the alternate paging channel. WCD 10 can thus remain in the sleep state for longer periods of time, thereby conserving battery power.

Figure 6:
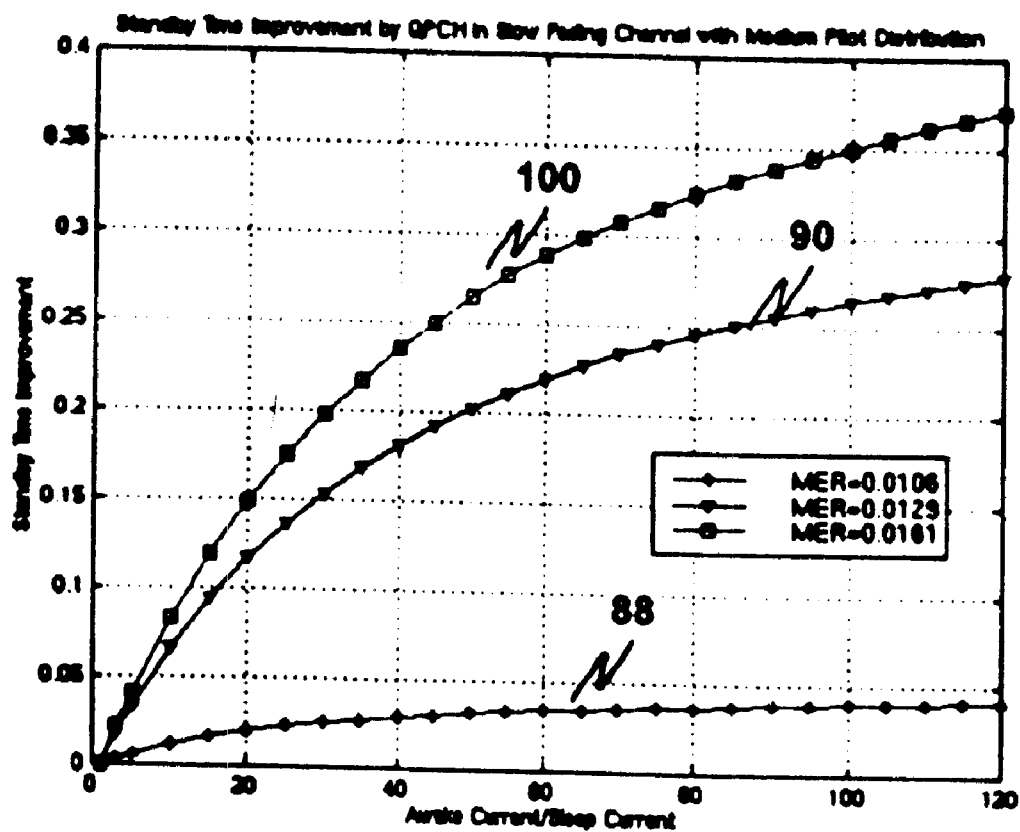

FIG. 6 illustrates the standby time improvement for a slow fading channel with a medium pilot distribution. The fading channel simulates the effect of motion of WCD 10. Graphs 88, 90 and 100 show the improvement in standby time when the paging message error rate (MER) is allowed to increase by 10%, 50%, and 100%, respectively. For example, graph 90 shows that when the MER is allowed to increase by 50% and the ratio of the awake current to the sleep current is 80, using the QPCH may result in a standby time improvement of nearly 25%.

While various embodiments of the invention have been described, modifications may be made without departing from the spirit and scope of the invention. These and other embodiments are within the scope of the following claims.

What is claimed is:

1. A method comprising:

predicting a signal strength in a first paging channel;

receiving a paging indicator on the first paging channel if the predicted signal strength is greater than a threshold;

determining whether the paging indicator indicates a presence of a paging message on a second paging channel; and receiving and demodulating the paging message on the second paging channel if the paging indicator indicates the presence of the paging message.

2. The method of claim 1, further comprising the step of:

entering into a sleep mode if the paging indicator does not indicate the presence of the paging message.

3. The method of claim 2, further comprising the step of: disabling the first paging channel and monitoring the second paging channel for a paging message when the predicted signal strength is less than the threshold.

4. The method of claim 1, wherein predicting the signal strength comprises estimating the signal strength as a function of historical pilot Ec/Io information representative of a signal strength of a pilot channel and a total received power spectral density in a carrier band.

5. The method of claim 4, further comprising using a linear filter to estimate the signal strength.

6. The method of claim 5, wherein the linear filter is a finite impulse response (FIR) filter.

7. The method of claim 5, wherein the linear filter is an infinite impulse response (IIR) filter.

8. The method of claim 5, wherein the linear filter comprises a plurality of taps having equal tap weights.

9. The method of claim 5, wherein the linear filter comprises a plurality of taps having exponentially decaying tap weights.

10. The method of claim 4, further comprising using a nonlinear filter to estimate the signal strength.

11. The method of claim 10, wherein the nonlinear filter comprises a Markov filter.

12. The method of claim 4, wherein the historical pilot Ec/Io information comprises at least one of searcher energy information, pilot strength estimate information, and a received signal strength indicator.

13. The method of claim 12, further comprising combining at least two of the searcher energy information, the pilot strength estimate information, and the received signal strength indicator using a maximal ratio combining technique.

14. The method of claim 12, further comprising combining at least two of the searcher energy information, the pilot strength estimate information, and the received signal strength indicator using an equal gain combining technique.

15. The method of claim 1, further comprising demodulating a spread spectrum message received from the second paging channel.

16. A processor readable medium containing processor executable instructions for:
receiving measurements of a signal strength of a first paging channel;
predicting a signal strength of a subsequent slot cycle for the first paging channel based on the received measurements;
receiving a paging indicator on the first paging channel if the predicted signal strength is greater than a threshold;
determining whether the paging indicator indicates a presence of a paging message on a second paging channel; and
configuring a demodulator to enable a paging channel operating mode based on the predicted signal strength.

17. The processor readable medium of claim 16, further containing processor executable instructions for predicting the signal strength by estimating the signal strength as a function of historical pilot Ec/Io information.

18. The processor readable medium of claim 17, further containing processor executable instructions for using a linear filter to estimate the signal strength.

19. The processor readable medium of claim 18, wherein the linear filter is a finite impulse response (FIR) filter.

20. The processor readable medium of claim 18, wherein the linear filter is an infinite impulse response (IIR) filter.

21. The processor readable medium of claim 18, wherein the linear filter comprises a plurality of taps having equal tap weights.

22. The processor readable medium of claim 18, wherein the linear filter comprises a plurality of taps having exponentially decaying tap weights.

23. The processor readable medium of claim 17, further containing processor executable instructions for using a nonlinear filter to estimate the signal strength.

24. The processor readable medium of claim 23, wherein the nonlinear filter comprises a Markov filter.

25. The processor readable medium of claim 17, wherein the historical pilot Ec/Io information comprises at least one of searcher energy information, pilot strength estimate information, and a received signal strength indicator.

26. The processor readable medium of claim 25, further containing processor executable instructions for combining at least two of the searcher energy information, the pilot strength estimate information, and the received signal strength indicator using a maximal ratio combining technique.

27. The processor readable medium of claim 25, further containing processor executable instructions for combining at least two of the searcher energy information, the pilot strength estimate information, and the received signal strength indicator using a equal gain combining technique.

28. An apparatus comprising:
a channel estimator module to predict a signal strength in an alternate paging channel; and
a modem to demodulate a paging indicator using the alternate paging channel when the predicted signal strength is at least a threshold;
wherein the modem determines a presence of a paging message on a main paging channel based on the paging indicator.

29. The apparatus of claim 28, wherein the channel estimator module comprises one or more software modules executing on a processor.

30. The apparatus of claim 28, wherein the channel estimator module is configured to predict the signal strength by estimating the signal strength as a function of historical pilot Ec/Io information.

31. The apparatus of claim 30, further comprising a linear filter to estimate the signal strength.

32. The apparatus of claim 31, wherein the linear filter is a finite impulse response (FIR) filter.

33. The apparatus of claim 31, wherein the linear filter is an infinite impulse response (IIR) filter.

34. The apparatus of claim 31, wherein the linear filter comprises a plurality of taps having equal tap weights.

35. The apparatus of claim 31, wherein the linear filter comprises a plurality of taps having exponentially decaying tap weights.

36. The apparatus of claim 30, further comprising a nonlinear filter to estimate the signal strength.

37. The apparatus of claim 36, wherein the nonlinear filter comprises a Markov filter.

38. The apparatus of claim 30, wherein the historical pilot Ec/Io information comprises at least one of searcher energy information, pilot strength estimate information, and a received signal strength indicator.

39. The apparatus of claim 38, wherein the channel estimator module is configured to combine at least two of the searcher energy information, the pilot strength estimate information, and the received signal strength indicator using a maximal ratio combining technique.

40. The apparatus of claim 38, wherein the channel estimator module is configured to combine at least two of the searcher energy information, the pilot strength estimate information, and the received signal strength indicator using an equal gain combining technique.

* * * * *